United States Patent [19]
Normile et al.

[11] Patent Number: 5,438,622
[45] Date of Patent: Aug. 1, 1995

[54] METHOD AND APPARATUS FOR IMPROVING THE SECURITY OF AN ELECTRONIC CODEBOOK ENCRYPTION SCHEME UTILIZING AN OFFSET IN THE PSEUDORANDOM SEQUENCE

[75] Inventors: James O. Normile, Woodside; Ke-Chiang Chu, Saratoga, both of Calif.

[73] Assignee: Apple Computer, Inc., Cupertino, Calif.

[21] Appl. No.: 184,978

[22] Filed: Jan. 21, 1994

[51] Int. Cl.⁶ ............................................. H04L 9/00
[52] U.S. Cl. .................................. 380/46; 364/224.2; 364/717; 331/78
[58] Field of Search .................... 380/46; 364/224.21, 364/717; 331/78

[56] References Cited

PUBLICATIONS

Bidzos, D. James and Kaliski Jr., Burt S., "An Overview of Cryptography", LAN Times Feb., 1990.
Blahut, Richard E., "Digital Transmission of Information", Chapter 12.6, first para., Addison-Wesley Publishing Company, Jul. 9, 1993.
Blahut, Richard E., "Digital Transmission of Information", Chapter 12.7, Addison-Wesley Publishing Company, Jul. 9, 1993.
Sklar, Bernard, "Digital Communications: Fundamentals and Applications", Chapter 12.4 introduction, p. 694, Prentice Hall Publishers, 1988.
Kaliski, Burt, "Packet Encryption" RSA Laboratories, Slides 1,3,5,7,9,11,13,15,17, Jan. 22, 1992.

*Primary Examiner*—David C. Cain
*Attorney, Agent, or Firm*—John S. Ferrell; Donna D. Hendry; V. Randall Gard

[57] ABSTRACT

A method and apparatus for improving the security of an electronic codebook encryption scheme comprises a transmitter unit for encoding or encrypting data and a separate authorized receiver for decoding or decrypting the data. During the encryption of the plaintext data, a randomly generated offset is introduced into the PN sequence to vary the starting point of the PN sequence as it is applied to the plaintext data. The offset is encrypted with the secret key and the unencrypted IV, encrypted offset, and ciphertext are exported by the transmitter to the receiver for decrypting.

The encoded communication is imported by the receiver and the encrypted offset portion is extracted. The receiver combines the encrypted offset with the secret key to decipher the offset value. The offset and PN sequence are then combined with the ciphertext, using an XOR gate, to recover the original plain text from the ciphertext.

In an alternative embodiment, the encoding PN sequence is composed of multiple, non-contiguous random sequence segments comprising a two-dimensional array. An incremental IV ID is generated for each IV issued in the creation of a segment. Each random sequence segment is identifiable by its IV ID. The starting point at which the random sequence segments are applied to a string of plaintext data is deferred from the beginning of the first random sequence segment in accordance with a composite offset.

29 Claims, 10 Drawing Sheets

METHOD AND APPARATUS FOR IMPROVING THE SECURITY OF AN ELECTRONIC CODEBOOK ENCRYPTION SCHEME UTILIZING AN OFFSET IN THE PSEUDORANDOM SEQUENCE

RELATED APPLICATION

This application is related to and incorporates by reference the subject matter of copending and commonly assigned application Ser. No. 08/110,402, entitled "Method And Apparatus For Variable Overhead Cached Encryption", filed Aug. 23, 1993.

BACKGROUND OF THE INVENTION

1. Field of the Invention

This invention relates to data encryption, and more particularly to an improved method and apparatus for encrypting and decrypting data signals with a randomly offset pseudorandom encoding sequence to provide increased security for transmitting data over an unsecured public channel.

2. Description of the Background Art

Data encryption is a function that ensures the privacy of a digital communication by preventing an unauthorized receiver from understanding the contents of a transmitted message. A conventional "symmetric secret key" cryptosystem is generally illustrated in FIG. 1(a). A transmitter transforms a plain text message into ciphertext using an invertable encryption transformation. This transformation is a function of the plain text input message and a secret key which is shared by both the transmitter and the receiver. The ciphertext is then transmitted over an unsecured public channel and the intended receiver of the message, also in possession of the secret key, applies the inverse transformation to decrypt the ciphertext and recover the original plain text message. The secret key is communicated to an authorized user through a secure channel (for example, a secure Key Exchange Algorithm) or through a public channel (for example, a Public Key Distribution System) and the secret key effectively dictates a specific encryption transformation from a family of cryptographic transformations. In general, any station in possession of the secret key may encrypt or decrypt messages.

A conventional cryptosystem can be said to exhibit "unconditional security" if the secret key is as long as the ciphertext message, each secret key is used only once, and all secret keys are equally likely. However, since most systems can be expected to transmit a large number of messages, the problem of distributing the secret key information becomes formidable. Most practical cryptosystems have short secret keys compared to the length of a message. The lessened security resulting from short secret keys is compensated for by relying on the complexity of the way that the secret key is combined with the data.

A particular example of a conventional cryptosystem, hereafter referred to as an electronic codebook, is generally illustrated in FIG. 1(b). The electronic codebook involves the use of a secret key that is shared by both the transmitter and the receiver. The transmitter utilizes the secret key to generate a deterministic, apparently random sequence of binary digits or numbers using a Pseudorandom Number (PN) generator. An essential feature of the PN generator is that with a specific secret key input, a unique PN sequence of arbitrary length may be generated. The PN sequence is then combined with the binary representation of the plain text message to be encrypted to produce a sequence of ciphertext. The combination of the PN sequence and the plain text must be accomplished using an invertable function. An invertable function is one that has a known inverse such that when the inverse function is applied to the ciphertext the original plain text can be extracted. For example, two's complement addition or bit-wise exclusive-OR (XOR) are two widely used invertable functions, although other functions can be employed.

Decoding of the encrypted ciphertext may be performed by the receiver using a method identical to that used by the transmitter. Ciphertext is received from the transmitter and combined using a logical XOR gate, with a pseudorandom sequence generated by a PN generator identical to that used in the transmitter. The essence of the electronic codebook system is that an encryption secret key is used to generate a pseudorandom sequence in the transmitter side, and the identical sequence is then generated in the receiver when the same encryption secret key is applied to the receiver PN generator. The XOR gate in the receiver provides the inverse function of the XOR gate in the transmitter so that logical combination of the ciphertext and the PN sequence in the receiver produces the same plain text that was originally encoded by the transmitter.

The conventional cryptosystem poses a number of problems, including inefficiencies associated with using the secret key only once, and the concomitant challenge of distributing new secret keys over clear channels. A system for variable-overhead cached encryption, as described in copending application Ser. No. 08/110,402, addresses the high overhead that results from generating PN sequences that are used only once to maximize security for transmitting data over public use lines. The system provides a means for storing and reusing PN sequences in order to increase the transmission rate of messages through a cryptosystem. A transmitter combines a secret key with an initialization vector (IV), using an XOR operation, to produce a temporal key. The temporal key is then used as an input to a pseudorandom number (PN) generator to produce a unique PN sequence of binary digits for each new temporal key. The IV, together with its corresponding PN sequence is stored in a cache, and the PN sequence is iteratively reused, as determined by a counter, to encrypt one or more plain text messages.

What is needed is a codebook encryption scheme that repeatedly reuses PN sequences to maximize efficiency yet varies the starting point at which the sequences are reused to reduce the likelihood of being decoded.

SUMMARY OF THE INVENTION

In accordance with the present invention, an apparatus and method are described for improving the security of an electronic codebook encryption scheme. A transmitter unit is used for encoding or encrypting data and a separate authorized receiver decodes or decrypts the data. Both the transmitter and receiver share a common secret key that has been communicated through a separate channel. The transmitter combines the secret key (which serves as a constant base value) with an Initialization Vector (IV), using an XOR operation to produce a temporal key. This temporal key is then used as an input to a Pseudorandom Number (PN) generator to produce a unique PN sequence of binary digits, for each new temporal key entered.

An offset is randomly generated and introduced into the PN sequence to further protect the ciphertext from unauthorized decryption. Beginning at the calculated offset, the PN sequence is applied to plaintext data for encryption. The starting point of the PN sequence applied to the plaintext data varies respectively with the value of the randomly generated offset. In order to accommodate the offset in the PN sequence, the PN sequence generated is longer than the anticipated message fragment by an amount that is at least as long as the offset value. The IV and corresponding PN sequence are iteratively reused with new randomly generated offsets to encrypt one or more plain text messages. The PN sequence and offset are combined with the plaintext data using an invertable combination function. An exclusive-OR (XOR) function is used in the preferred embodiment to produce encrypted plaintext data (ciphertext). The offset is encrypted with the secret key and the unencrypted IV, encrypted offset, and ciphertext are exported by the transmitter to the receiver for decrypting. A new offset is preferably chosen with equal probability from the set of all possible offset values since this has the desirable results of improving security and of providing a large number of different encoding sequences over the life of the secret key.

The encoded communication is imported by the receiver and the encrypted offset portion is extracted. The receiver combines the encrypted offset with the secret key to decipher the offset value. The secret key is then applied to the IV to produce a temporal key and corresponding PN sequence identical to the sequence used by the transmitter to encode the data. The offset and PN sequence are then combined with the ciphertext, using an XOR gate, to recover the original plaintext from the ciphertext.

In an alternative embodiment, the encoding PN sequence is composed of multiple, non-contiguous random sequence segments comprising a two-dimensional array. Each segment is generated by combining the secret key and IV to produce a temporal key that is used as an input to a PN generator. The PN generator produces a unique PN sequence of binary digits for each temporal key entered. Unlike the contiguous PN sequence created in the preferred embodiment, multiple segments of generally shorter length are created and arranged in a two-dimensional array in this alternative embodiment. An incremental IV identifier (ID) is generated for each IV issued in the creation of a segment. Each random sequence segment is identifiable by its respective IV ID. The plurality of random sequence segments are arranged in a two-dimensional array having an 'm' (vertical) direction and an 'n' (horizontal) direction. The starting point at which the random sequence segments are applied to a string of plaintext data is offset from the very beginning of the first random sequence segment. A first offset number is generated and applied to the array produced in the PN generator to offset the starting point in the m direction. A second offset is generated and applied to the array to offset the starting point in the n direction. In other words, the first offset number selects one random sequence segment within the array. The second offset is applied to the selected random sequence segment to defer the start at which the two-dimensional array is combined with the plaintext data. Starting at the coordinate point determined by the offset, the array is combined with plaintext data using an XOR operation to produce ciphertext. The offset value is next encrypted with the secret key and then the unencrypted IV ID, unencrypted IV, encrypted offset and ciphertext are exported by the transmitter to the receiver for decrypting.

In another alternative embodiment of the present invention, the PN sequences are stored in a cache and reused. In order to improve the efficiency of future decoding of ciphertext utilizing a specific IV, the PN sequence generated in the transmitter is stored in a cache together with its corresponding IV and is reused a predetermined number of times before a new IV and PN sequence are generated. The first block of ciphertext incoming to the receiver triggers the PN generator to produce the PN sequence needed to decode the ciphertext. Each PN sequence generated is stored in a cache. When the next block of ciphertext is received using the same IV, the PN sequence need not be regenerated by the PN generator, but rather may be read from cache as a stored sequence.

DESCRIPTION OF THE PREFERRED EMBODIMENT

The encryption-decryption system of the present invention consists of a unique combination of digital functional blocks, all of which are separately conventional and well understood in the art. The system is preferably implemented on a general purpose computer using programmed instructions; however, the discussion which follows also teaches the invention in terms of functional blocks which may be readily implemented using conventional discrete or integrated digital circuitry.

Figure 2A:
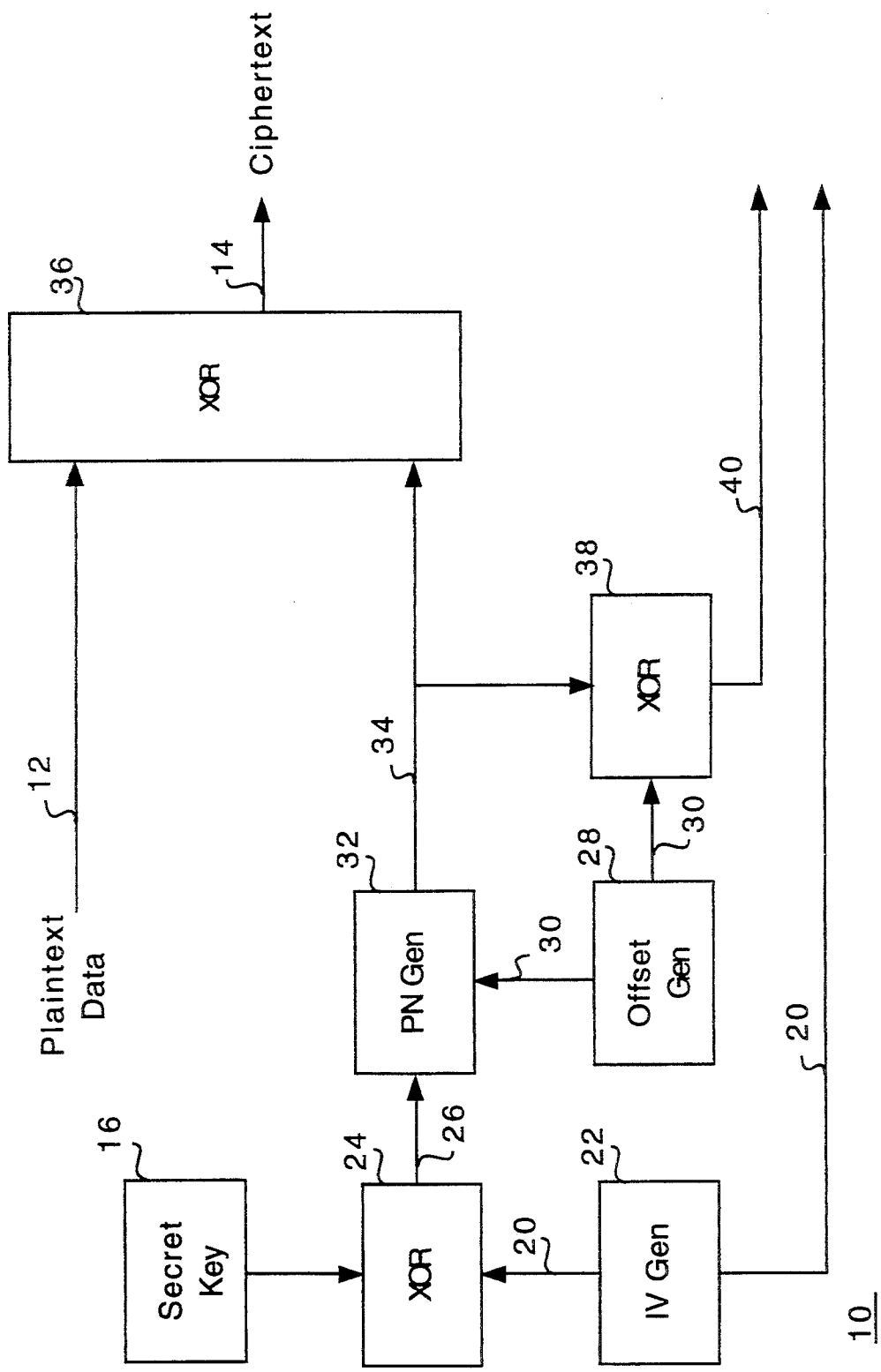
FIG. 2(a) is a block diagram showing the transmitter of the offset pseudorandom sequence encryption system of the present invention.

Referring now to FIG. 2(a), a transmitter 10 is shown for encrypting plaintext data 12 into ciphertext 14.

Figure 1A:
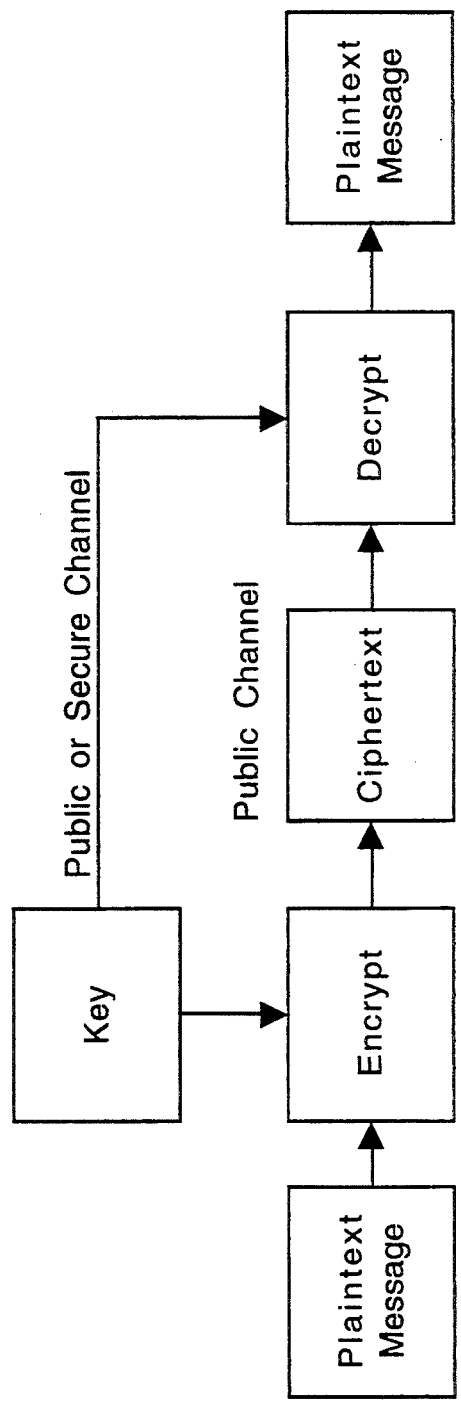
FIG. 1(a) is a block diagram showing a conventional symmetric secret key cryptosystem.
Figure 1B:
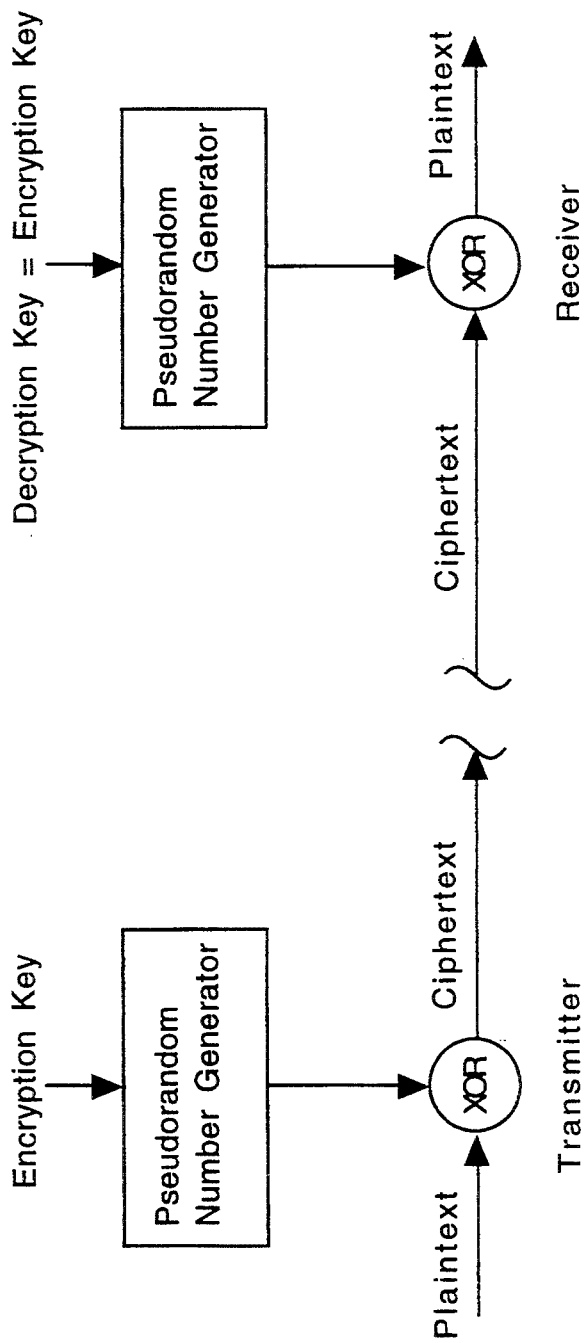
FIG. 1(b) is a block diagram showing an example electronic codebook cryptosystem of the prior art.

Plaintext data 12 is digital information which may be readily understood by both a sender and a receiver and may also be readily understood by other unauthorized third parties having access to the communications channel. The function of the transmitter 10 is to encode or encrypt the plaintext data 12 in such a way that the information is usable only to a receiver having a bona fide access to the data. A central feature of the transmitter 10 is a secret key 16 which is secret as to third parties but shared between the transmitter and a receiver 18 (discussed below with reference to FIG. 3) of the plaintext data 12. As discussed with reference to FIG. 1(a), the secret key 16 would ideally be infinite in length and would be unique as to every message communicated between the transmitter 10 and the receiver 18. In practice, however, the secret key 16 is relayed only periodically between the transmitter 10 and the receiver 18 and during the periods between the relay of the secret key, the secret key is used repetitively to encrypt plaintext data 12 from the transmitter 10 before transmission to the receiver 18.

An initialization vector (IV) 20 is produced by IV generator 22 and utilized by the transmitter 10 and the receiver 18 to extend the usable life of the secret key 16. The secret key 16 is a relatively expensive component to generate and maintain. The secret key 16 must be randomly generated and must be securely transmitted between the transmitter 10 and the receiver 18 in a secure channel which is separate from the communication system through which the ciphertext 14 is transmitted. Consequently, even though the security of the secret key 16 diminishes with each successive use, efficiency demands that maximum utilization of the secret key occur. One way of extending the utilization of the secret key 16 is to combine the secret key with a local secret key such as the IV 20. Preferably, the IV generator 22 generates a random sequence having the same length as the secret key 16. The IV 20 is combined with the secret key 16 using a conventional exclusive-OR (XOR) gate 24 to produce a temporal key 26. Various other logical functions can be equivalently used in place of the XOR gate 24 to mask the identity of the secret key. This logical function need not be invertable. The XOR function is applied bitwise and is defined by a logical "0" whenever all inputs are the same, and a logical "1" otherwise. The IV 20 is transmitted to the receiver 18 as part of the communication sequence containing the ciphertext 14. Information transmitted from the transmitter 10 to the receiver 18 includes a block of ciphertext 14 concatenated with the IV 20. In essence, the IV 20 becomes public in that it is transmitted in an unencrypted format and may be more easily appropriated by third parties. However, since the IV 20 is always encoded with the secret key 16 to produce the temporal key 26, the value of knowing this IV is limited. Since the IV 20 is merely a component of the temporal key 26, it would be difficult to determine the value of the temporal key 26 knowing only the value of the IV 20.

An offset generator 28 generates a random offset 30 that is combined with the temporal key 26 in a Pseudorandom Number (PN) generator 32. The temporal key 26 acts as a seed to the PN generator 32. The PN generator 32 is a deterministic machine, conventional in the art, and characterized by the fact that, given a specific input or seed value, a unique and repeatable output sequence of arbitrary length can be generated. The output sequence from the PN generator 32 is referred to in FIG. 2(a) as a PN sequence 34. The offset 30 determines the starting point at which the PN sequence 34 is applied to the plaintext data 12 at XOR gate 36 to encrypt the data. Thus, using this offset, only a subset of the original PN sequence 34 is applied to the plaintext data 12. In order to accommodate the offset, the PN sequence 34 generated is longer than the length of the plaintext data 12 to be encrypted, by an amount at least equal to the offset 30. Combining the offset 30 with the temporal key 26 in the PN generator 32 produces a PN sequence 34 including a deferred starting point. The deferred starting point is determined by applying the offset to the PN sequence at the beginning of the sequence string. The deferred starting point is the point along the sequence string that is equal to the offset value. The plaintext data 12 is combined with the offset PN sequence 34 in XOR gate 36. XOR gate 36 is conventional, and similar in construction to XOR gate 24. Beginning at the deferred starting point, the offset PN sequence is combined with the plaintext data 12 to produce the ciphertext 14. The offset 30 is separately encrypted with the PN sequence 34 in an XOR gate 38. The clear IV 20, encrypted offset value 40, and ciphertext 14 are then concatenated and transmitted to the receiver 18.

Figure 2B:
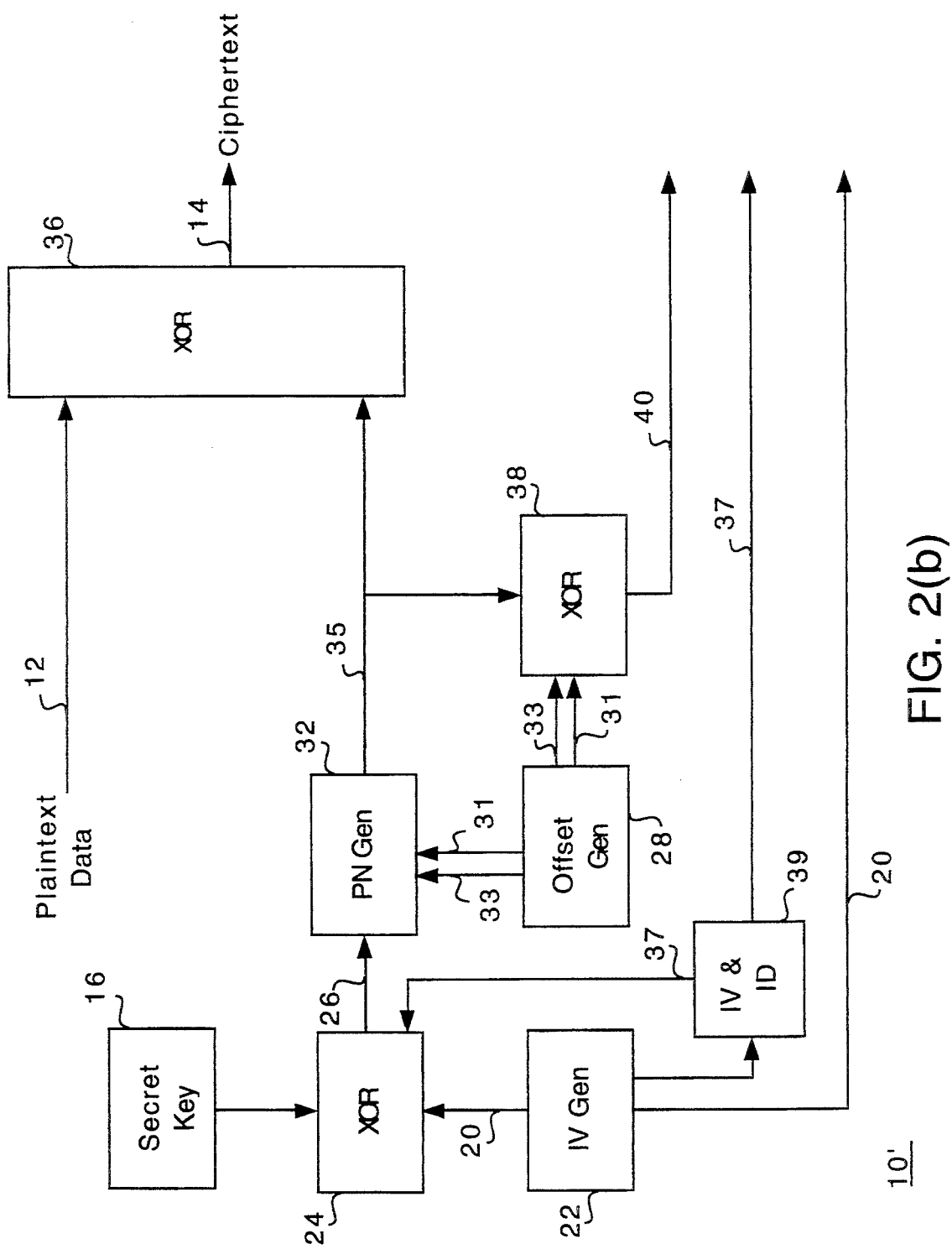
FIG. 2(b) is a block diagram showing an alternative embodiment of the transmitter of the offset pseudorandom sequence encryption system.
Figure 2C:
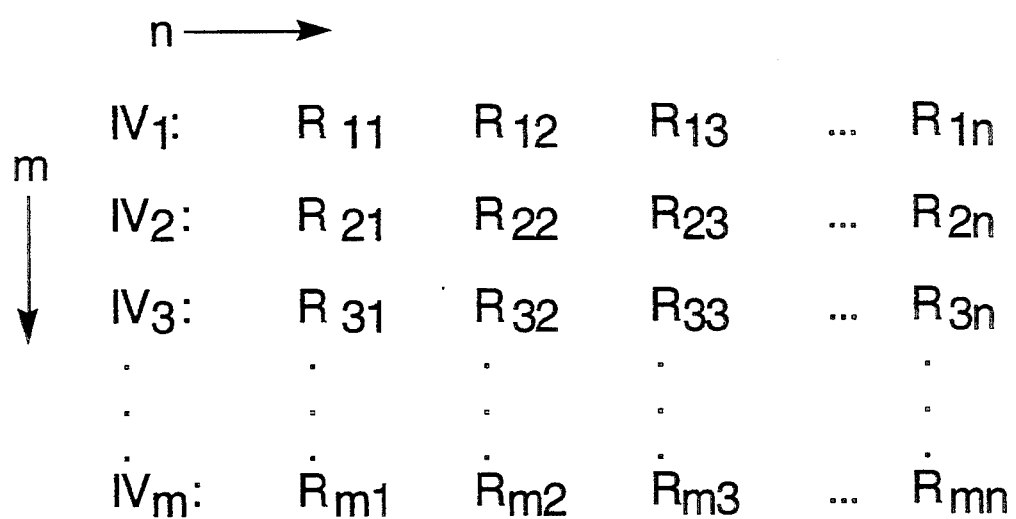
FIG. 2(c) is a two-dimensional array matrix of PN sequence segments in accordance with the alternative embodiment of FIG. 2(b)

Referring now to FIG. 2(b) and FIG. 2(c), a block diagram of a transmitter 10' in accordance with an alternative embodiment of the present invention is shown in FIG. 2(b) in which the PN generator 32 produces multiple, non-contiguous PN sequence segments 35 as represented in FIG. 2(c). In this alternative embodiment, multiple IVs 20 are generated in IV generator 22 and an incremental IV identifier (ID) 37 is generated in IV ID generator 39 for each IV 20 generated. Each IV 20 and accompanying IV ID 37, combined with the secret key 16, produce a numbered temporal key 26. The numbered temporal key 26 acts as a seed for the PN generator 32, which produces a PN sequence segment 35 that is uniquely identifiable by its IV ID 37. The plurality of PN sequence segments 35 are arranged in a two-dimensional array as illustrated in FIG. 2(c). The two-dimensional array matrix has an 'm' (vertical) direction and an 'n' (horizontal) direction. Although a two-dimensional array matrix is described, other multi-dimensional arrays may be equivalently used.

Where a multi-dimensional array is generated, a composite offset comprising a plurality of offset values 31, 33 is also generated to further ensure the security of the encrypted data from unauthorized decryption. A first offset value 31 is generated and applied to the PN sequence segments 35 to offset the starting point of the two-dimensional array in the m direction. A second offset value 33 is generated and applied to the PN sequence segments 35 to offset the starting point of the two-dimensional array in the n direction.

In other words, the first offset number selects one random sequence segment within the array. The second offset is applied to the selected random sequence segment to defer the start at which the two-dimensional array is combined with the plaintext data. For example, assume a composite offset is to be applied to the two-dimensional array shown in FIG. 2(c). First, a composite offset 30, comprised of two offset values, is generated by the offset generator 28. Assume the offset values are 2 and 3. The first offset value, 2, is applied to the array in the m direction and determines that $IV_2$ is the selected sequence segment. Next, the second offset value, 3, is applied to the selected sequence segment, $IV_2$, in the n direction and determines that $R_{23}$ is the point of deferment. The coordinate point 2,3, when applied to the example array, defers the starting point to $R_{23}$. It is at this point, $R_{23}$, that the array is combined with the plaintext data 12 to encrypt the data and produce the ciphertext 14.

Beginning at the deferred starting point of the two-dimensional array, the PN sequence segments 35 are combined with the plaintext data 12 to produce the ciphertext 14. The composite offset 30 is separately encrypted with the PN sequence segments 35 in an XOR gate 38. The unencrypted IV ID 37, unencrypted IV 20, encrypted offset 40 and ciphertext 14 are exported by the transmitter 10 to the receiver 18 for decrypting. The offset 30 and the plaintext data 12 are not encrypted with the same PN sequence. In the preferred embodiment, the plaintext data 12 is encrypted with the PN sequence segments 35 as specified by the composite offset 30. The offset 30 is encrypted with the PN sequence segments 35 as specified by the IV 20 and IV ID 37 that are sent in an unencrypted format to the receiver 18 ahead of the ciphertext 14. Other schemes for encrypting the offset known to those skilled in the art may be equivalently used.

Figure 3:
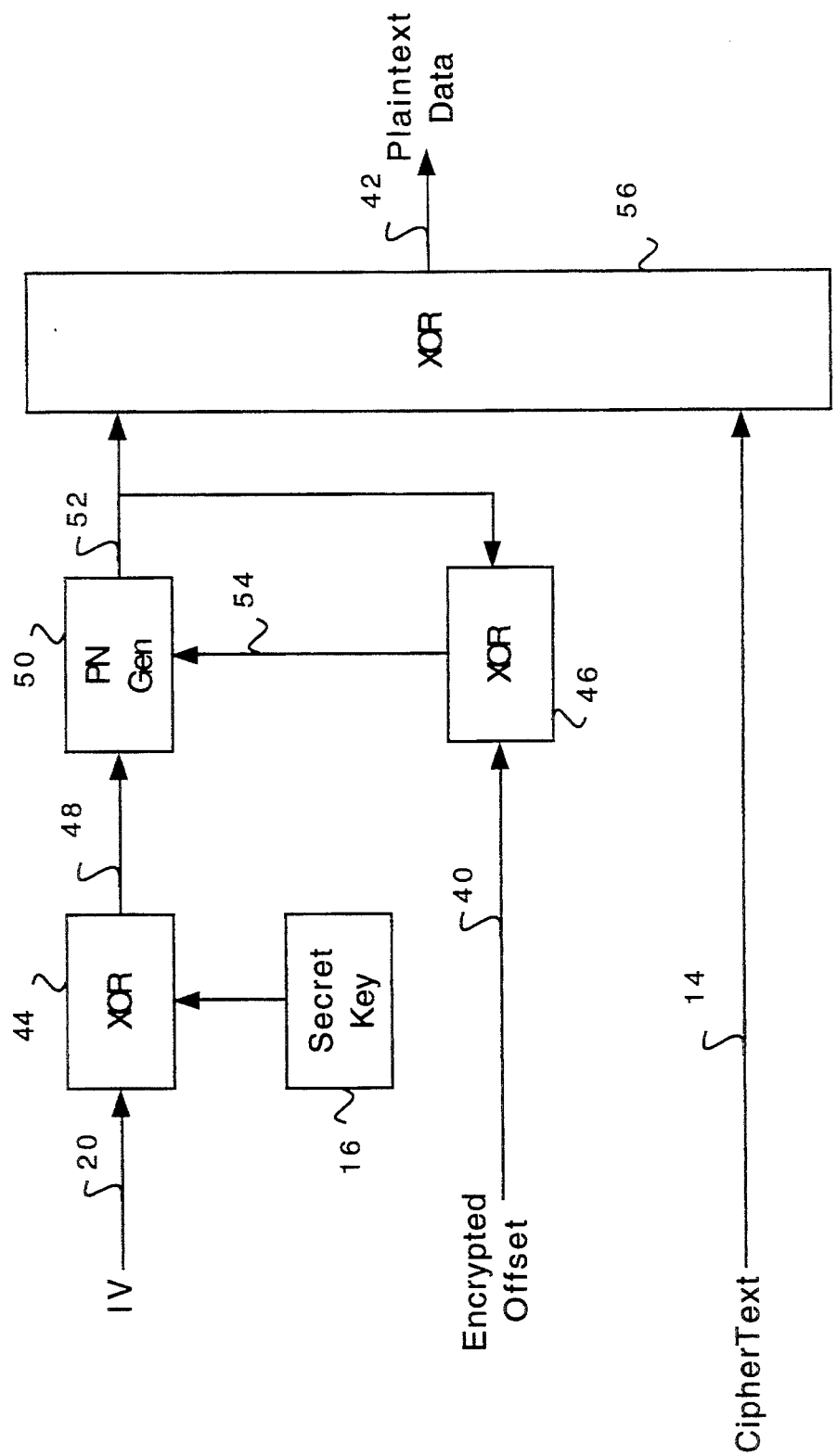
FIG. 3 is a block diagram showing the receiver of the offset pseudorandom sequence encryption system of the present invention.

Referring now to FIG. 3, a receiver 18 is shown in which ciphertext 14 is decoded to produce unencrypted plaintext data 42, which is identical to the plaintext data 12 originally encoded in transmitter 10. As the ciphertext communication sequence is imported by the receiver 18, the unencrypted IV 20 is separated and applied to XOR gate 44. Other functions may be equivalently substituted in place of XOR gate 44; however, the functions implemented by XOR gate 24 and XOR gate 44 must be the same. Just as in the case with the transmitter 10, the IV 20 is combined with the secret key 16 in XOR gate 44 to produce a temporal key 48. It should be noted that this temporal key 48 is identical to the corresponding temporal key 26 produced in the transmitter 10 by the XOR gate 24 combination of the secret key 16 and the IV 20. The PN generator 50 receives the temporal key 48 and produces a PN sequence 52 identical to the corresponding PN sequence 34 used in the encoding of the ciphertext 14 by the transmitter 10. Next, the encrypted offset 40 is separated from the ciphertext communication sequence and applied to XOR gate 46. Again, other functions may be equivalently substituted for XOR gate 46, subject to the invertability constraints discussed above. The encrypted offset 40 is combined with the PN sequence 52 in XOR gate 46 to generate a decrypted offset 54. This offset 54 is identical to the offset 30 generated in the transmitter 10 by the offset generator 28. The XOR gate 56 combines the PN sequence 52 and decrypied offset 54 with the ciphertext 14 to produce the plaintext data 42 which is identical in content to the corresponding plaintext data 12 originally encoded in the transmitter 10.

Decoding of the ciphertext 14 produced using a two-dimensional array of multiple PN sequence segments 35 in accordance with the alternative embodiment, differs slightly from the decoding of the preferred embodiment. In the alternative embodiment, the IV ID 37 is utilized along with the IV 20 to produce multiple temporal keys 26 which are then combined with the secret key 16 to reproduce the PN sequence segments 35 of the two-dimensional array. The unencrypted IV 20 and IV ID 37 that arrive at the receiver 18 preceeding the ciphertext 14 are also utilized to decrypt the encrypted offset 40. The decrypted offset 54 is then applied to the two dimensional array of PN sequence segments 35 generated in the receiver 18 to determine the starting point at which to apply the PN sequence to the ciphertext. The offset PN sequence segments 35 are then combined with the ciphertext 14 to reproduce the original plaintext data 42.

An important benefit of the encryption system of the present invention is that the transmitter 10 and the receiver 18 are self-synchronizing. That is, assuming the secret key is shared, everything needed to decode a block of transmitted data is contained within the message. Knowledge of prior messages or sequences is not required.

Figure 4:
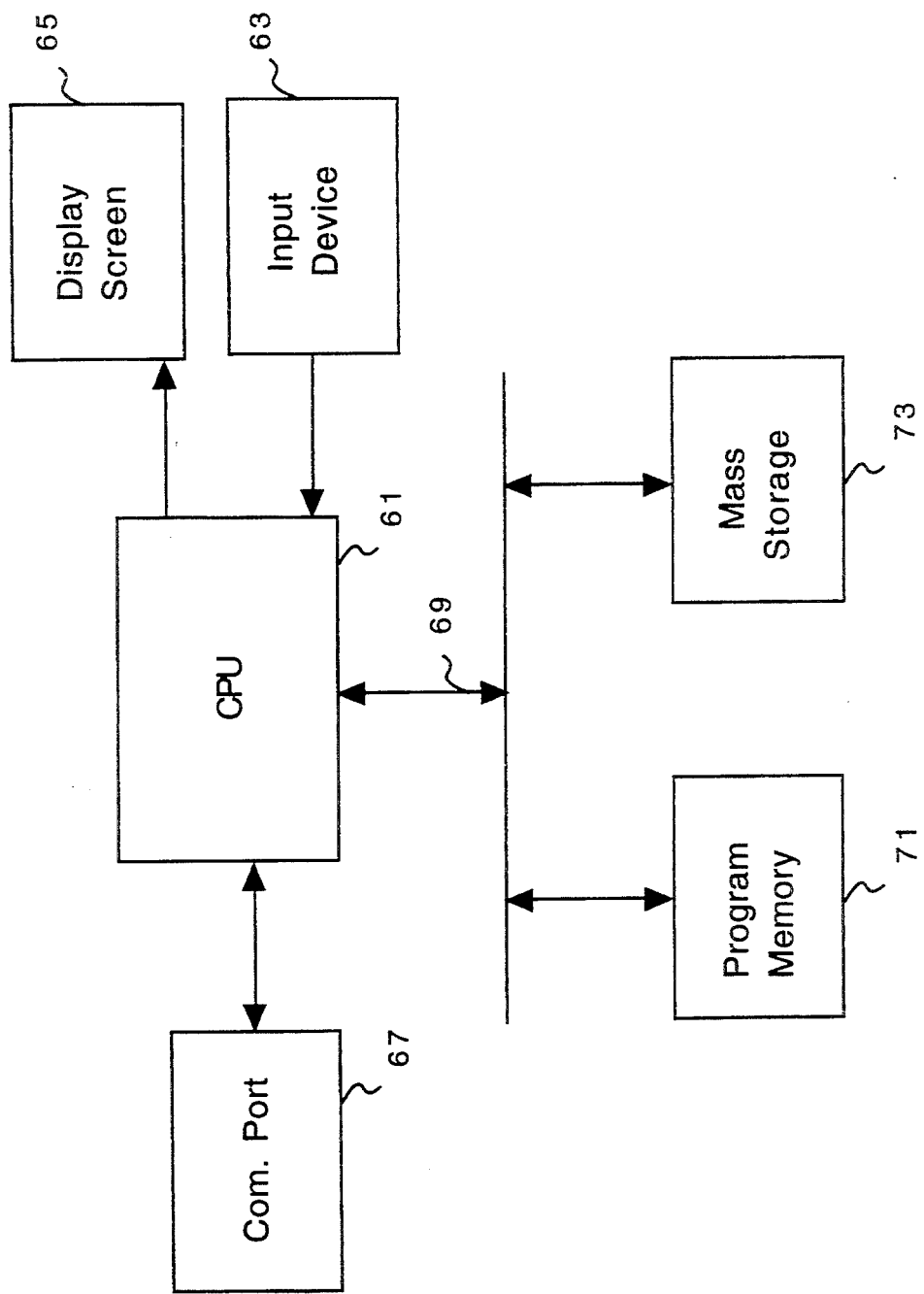
FIG. 4 is a block diagram showing a general purpose computer which is used to implement the offset pseudorandom sequence encryption system of the present invention.

Referring now to FIG. 4, a block diagram is shown of a general purpose computer 60 used for the preferred implementation of the encryption system shown in FIGS. 2(a) and 3. The preferred implementation of the present invention consists of programmed instructions implemented on an Apple Macintosh ® computer, manufactured by Apple Computer, Inc. of Cupertino, Calif. The general method steps, described below, can be equivalently implemented on any general purpose computer and many other programmable processor-based systems. The general purpose computer 60 consists of a CPU 61 attached to a number of processing components. The CPU 61 contains an input device 63 and a display screen 65 through which a user can interact with the CPU 61. The CPU 61 is connected to a communication port 67 for interfacing with other processors and communication devices, such as modems and area networks. The CPU 61 further comprises a databus 69 for connecting various memories, including a program memory 71 and mass storage 73. The program memory 71 contains operating instructions for directing the control of the CPU 61. Mass storage 73 contains stored data that is utilized by the CPU 61 in executing the program instructions from the program memory 71.

Referring also to FIGS. 2(a) and 3, the XOR gates 24, 36, 38, 44, 46 and 56 are implemented by the CPU 61 using Boolean arithmetic. The PN generators 32 and 50 are implemented by the CPU 61 using a conventional pseudorandom number generator algorithm. The computer system 60 can implement the encryption system in a number of ways. A first computer system can act as a transmitter 10 and export ciphertext 14 to a second computer system via the communication port 67. In this operation mode, the first computer acts as the transmitter 10 while the second computer acts as the receiver 18. This first mode of operation provides for a secure communication of sensitive data.

In an alternative operating mode, a single computer system 60 acts as both the transmitter 10 and as the receiver 18, storing ciphertext 14 to mass storage 73 and later retrieving the stored ciphertext 14 for decoding and use. The purpose of this second mode of operation is to allow for the secure storage of sensitive data.

Figure 5:
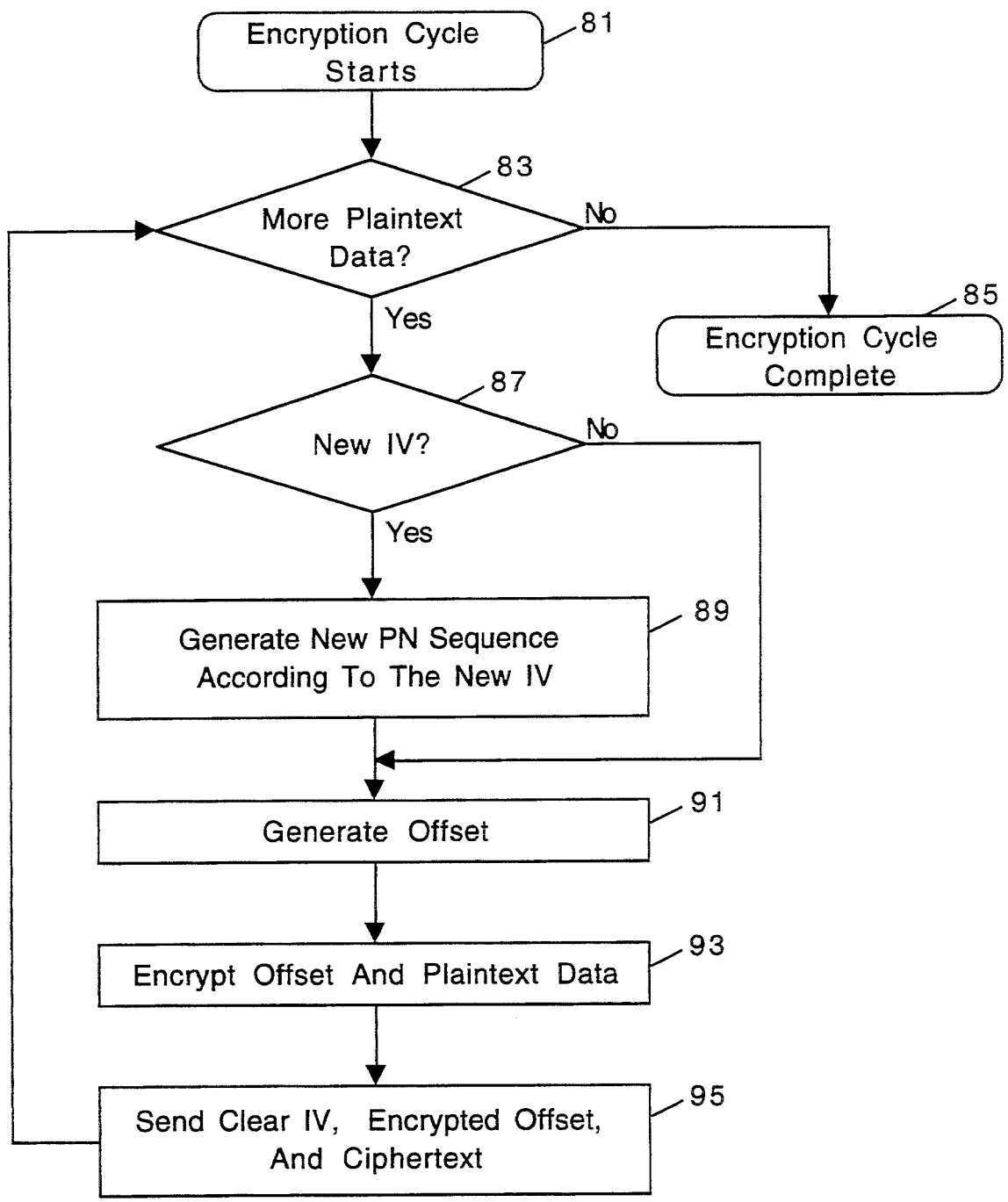
FIG. 5 is a flow diagram showing the method steps of transmitting encrypted data using the apparatus of FIG. 2(a)

Referring now to FIG. 5, a flow chart is shown outlining the programmed instruction steps which are executed by the general purpose computer 60, acting in the mode of a transmitter 10 (FIG. 2(a)) in encrypting plaintext data 12 to produce the ciphertext 14 of the present invention. Step 81 is the starting point for the encrypting instructions of FIG. 5. Plaintext data 12 is commonly input into the transmitter 10 from a source in a series of data packets. The packets are exported through a network to a receiver 18 where they are reassembled into their original format. The programmed instructions prompt the CPU 61 to determine 83 whether more plaintext data 12 will be imported from the source. If no further plaintext data 12 is delivered for encryption, the encryption cycle is complete 85. If further plaintext data 12 is available from the source, the CPU 61 determines whether a new IV 20 is to be generated 87. If the CPU 61 determines that a new IV 20 is in order, it will first signal the IV generator 22 to produce a new IV 20 and generate 89 a PN sequence 34 in accordance with the new IV 20. After the new PN sequence 34 is generated 89, the CPU 61 will then generate 91 an offset 30. If no new IV 20 is generated 87, the CPU 61 will skip step 89 and directly generate 91 an offset 30. In step 93, the offset 30 and the PN sequence 34 are combined with the plaintext data 12 in order to encrypt 93 the plaintext data 12 and produce ciphertext 14. Also in step 93, the offset 30 is separately encrypted with the PN sequence 34. The clear (unencrypted) IV 20, encrypted offset 40 and ciphertext 14 are transmitted 95 to a receiver 18. The encryption cycle reverts to step 83 and prompts the CPU 61 to look for more plaintext data 12. Only when the CPU 61 determines that no more plaintext data 12 is forthcoming from the source, will the encryption cycle be complete 85.

Figure 6:
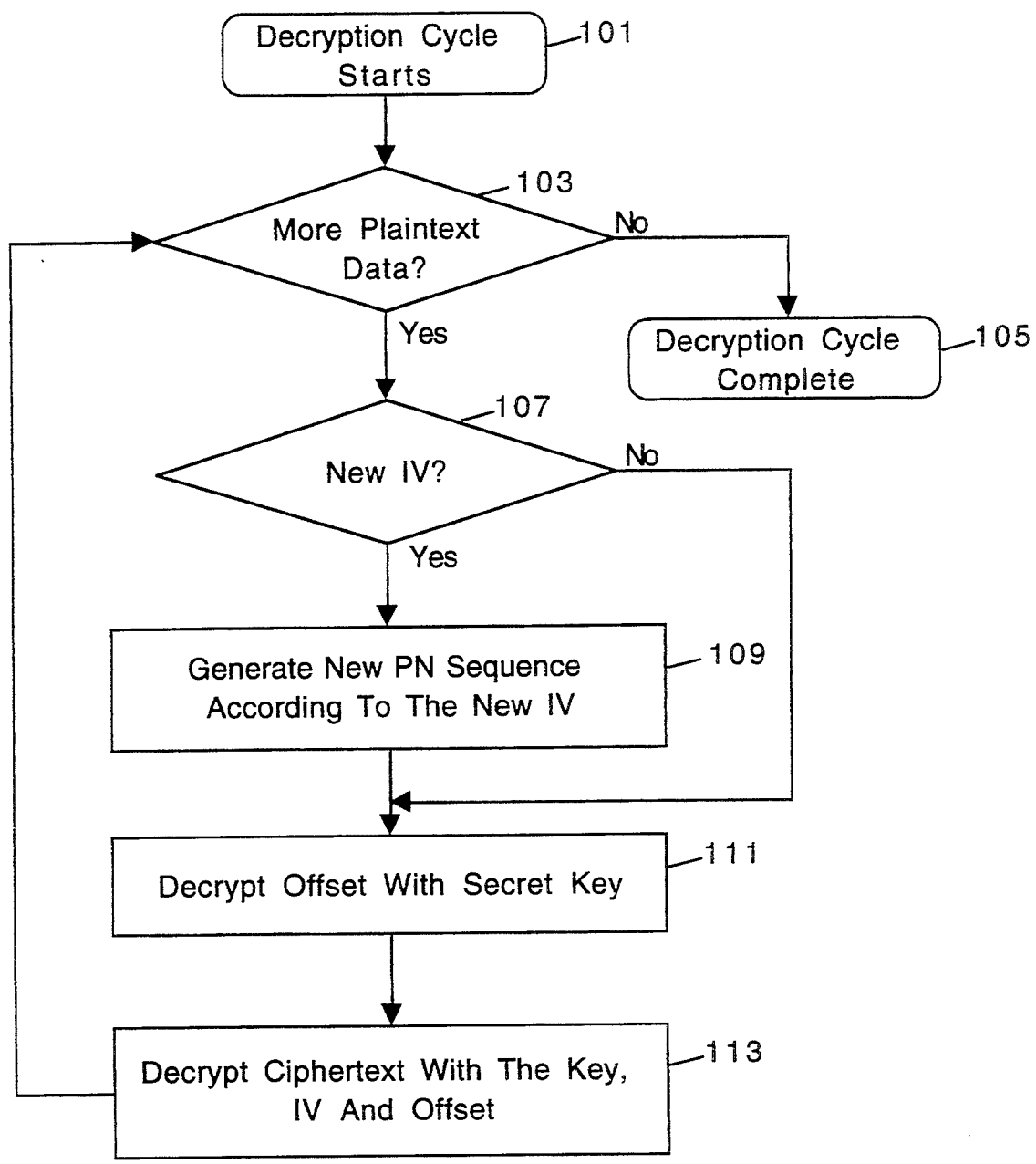
FIG. 6 is a flow diagram showing the method steps of receiving encrypted data using the apparatus of FIG. 3.

Referring now to FIG. 6, with the computer 60 acting in the mode of a receiver 18 (FIG. 3), the decryption cycle starts 101 when the receiver 18 imports the ciphertext 14. The CPU 61 determines 103 if there is more ciphertext 14 forthcoming from the transmitter. If not, the decryption cycle is complete 105. However, where more ciphertext 14 is being received, the unencrypted IV 20, encrypted offset 40 and ciphertext 14 sequences are separated in step 105. The programmed instructions prompt the CPU 61 to determine 107 whether a new IV 20 has been transmitted. If the CPU 61 determines that a new IV 20 has been transmitted, it will first generate 109 a new PN sequence 34 according to the new IV 20 and then decrypt 111 the offset 40 with the PN sequence 34. If no new IV 20 has been transmitted, the CPU 61 will skip step 109 and directly decrypt 111 the offset 40 using the PN sequence 34. The CPU 61 will utilize the IV 20, decrypted offset 54 and PN sequence 34 to decrypt 113 the ciphertext 14 and reproduce the original plaintext data 12. The decryption cycle then reverts to step 103 where the CPU 61 determines if any more ciphertext 14 will be imported for decryption. Only when the CPU 61 determines that no more ciphertext is forthcoming will the decryption cycle be complete 105.

Figure 7:
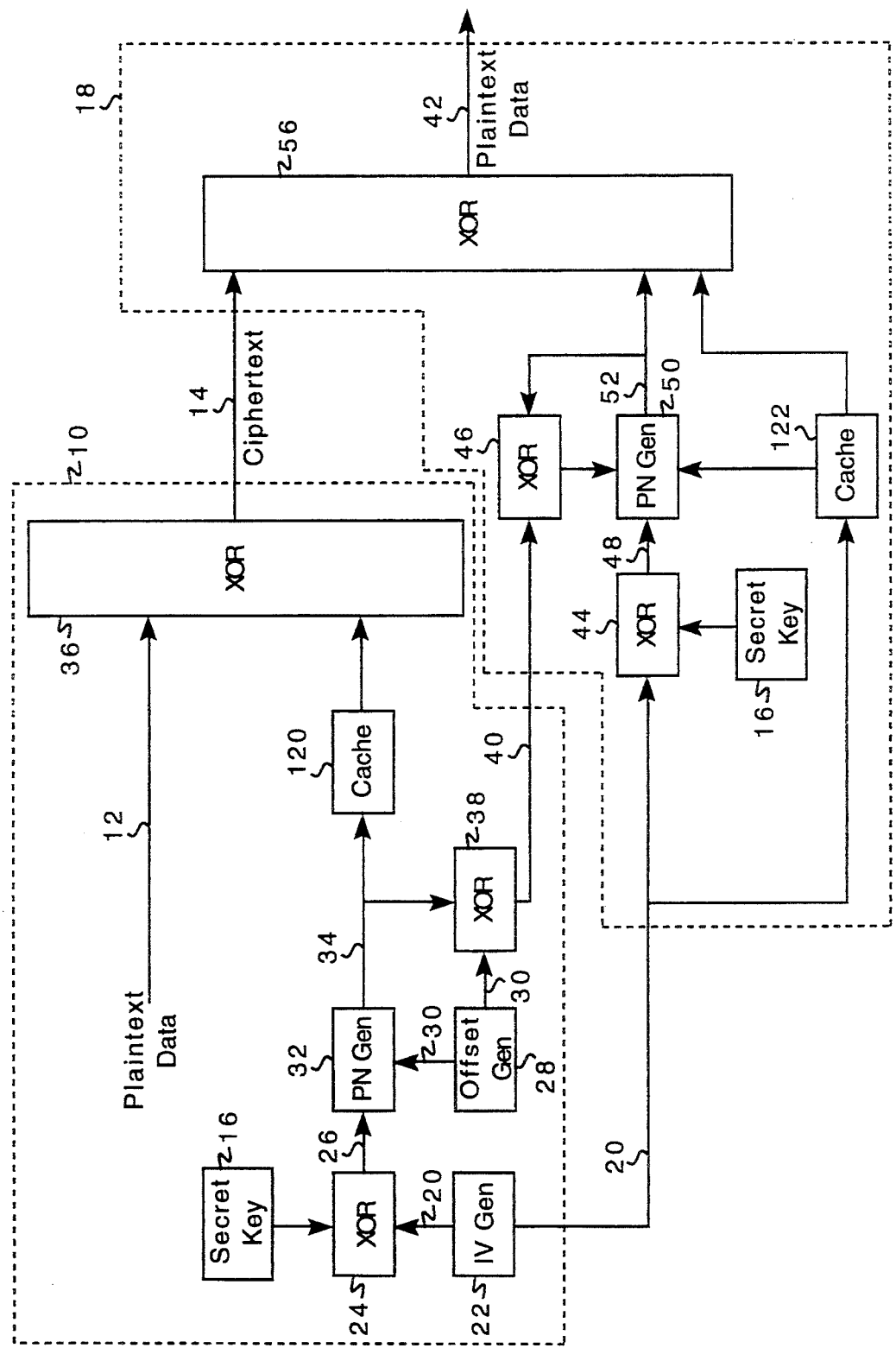
FIG. 7 is a block diagram showing an alternative embodiment of the present invention where the transmitter and receiver of the offset pseudorandom sequence encryption system further include a cache for storing the PN sequences generated.

Referring now to FIG. 7, an alternative embodiment is shown where the transmitter and receiver further include caches. The efficiency of encryption by the transmitter 10 and decryption by the receiver 18 may be enhanced by concurrently utilizing a caching system. The caching system is the subject of U.S. patent application Ser. No. 08/110,402 filed Aug. 23, 1993, and is completely described therein; therefore, it will not be fully reiterated here. Briefly, in order to improve the efficiency of encoding and decoding utilizing a specific IV 20, the PN sequence 34 associated with the IV 20 is stored in cache 120 together with its corresponding IV 20 and is reused a predetermined number of times before a new IV 20 and PN sequence 34 are generated. A first PN sequence 34 is applied to a first block of plaintext data 12 and the PN sequence 34 is then stored in the transmitter's cache 120. The same cached PN sequence will be used to encrypt a predetermined number of blocks of plaintext data 12. The first block of ciphertext 14 received by the receiver 18 signals the receiver's PN generator 50 to produce the PN sequence 52 needed to decode the ciphertext 14. Each PN sequence 52 generated is stored in a cache 122. When the next block of ciphertext 14 is received using the same IV 20, the PN sequence 52 need not be regenerated by PN generator 50, but rather may be read from cache 122 as a stored sequence. When the ciphertext 14 is received by the receiver 18, the IV 20 is compared in the cache 122 with other IVs 20 stored in the cache 122 to determine whether the specific IV 20 has previously been received and stored. If the specific IV 20 is found to be stored in cache 122, then the PN sequence 52 associated with that IV 20 is written to an XOR gate 56, and the stored PN sequence 52 is used to decode the imported ciphertext 14.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. An apparatus for the communication of encrypted data, the apparatus comprising a transmitter which further comprises:

a first Pseudorandom Number (PN) generator for generating a first sequence of pseudorandom numbers;

an offset generator which operates to select a subset of the first sequence of pseudorandom numbers; and an encoder comprising a first input for receiving the subset of the first sequence of pseudorandom numbers and a second input for receiving an original sequence of plaintext data, in which the encoder combines the subset of the first sequence of pseudorandom numbers and the sequence of plaintext data to produce an encrypted data output.

2. The apparatus according to claim 1 further comprising a receiver, the receiver comprising:

a second PN generator for generating a second sequence of pseudorandom numbers; and a decoder comprising a first input for receiving the second sequence of pseudorandom numbers and a second input for receiving the output of the transmitter containing the encrypted data, in which the decoder combines the second sequence of pseudorandom numbers and the encrypted data to produce the original sequence of plaintext data as an output.

3. The apparatus according to claim 2 wherein the first input of the decoder receives a subset of the second sequences of pseudorandom numbers which is identical to the subset of the first sequence of pseudorandom numbers.

4. The apparatus according to claim 1, wherein the first PN generator and the second PN generator are both initialized using a secret key which is commonly utilized by both the transmitter and the receiver.

5. The apparatus according to claim 4, wherein the first PN generator and the second PN generator are both further initialized using an initialization vector which is commonly utilized by both the transmitter and receiver.

6. The apparatus according to claim 5, wherein the first PN generator and the second PN generator are both initialized by logically combining the secret key and the initialization vector.

7. The apparatus according to claim 5, further comprising an initialization vector generator coupled to the PN generator for selectively generating initialization vectors.

8. The apparatus according to claim 5, wherein the encrypted data is transferred from the transmitter to the receiver in a data stream, the data stream comprising the initialization vector, the encrypted offset and the encrypted data.

9. The apparatus according to claim 1, wherein the offset generator selects a subset of the sequence of pseudorandom numbers for combining with the plaintext data sequence by initiating the combining of sequences at a deferred starting point along the sequence of pseudorandom numbers.

10. The apparatus according to claim 1, wherein the first sequence of pseudorandom numbers is contiguous.

11. The apparatus according to claim 1, wherein the first sequence of pseudorandom numbers is comprised of multiple, non-contiguous segments forming a multi-dimensional array.

12. The apparatus according to claim 11, wherein:
the first PN generator is initialized using an initialization vector;
a new initialization vector is generated from an initialization vector generator for each PN sequence segment;
an initialization vector identifier is generated for each initialization vector generated; and
the PN sequence segments are indexed by initialization vectors concatenated with their respective initialization vector identifiers.

13. The apparatus according to claim 12, wherein the offset is a composite of at least two values which, when applied to the multidimensional array, defers the starting point of the array.

14. The apparatus according to claim 1, wherein the transmitter and receiver are implemented using at least one general purpose computer.

15. An encryption system comprising:
transmitter means for encrypting plaintext data into ciphertext, the transmitter means further comprising:
first pseudorandom number generating means for generating a first pseudorandom number sequence;
offset generating means for generating a random offset; and
encoding means for combining the first pseudorandom number sequence with the offset and plaintext data to produce the ciphertext; and
receiver means for receiving the ciphertext from the transmitter means and decrypting the ciphertext to the original plaintext data.

16. The encryption system according to claim 15, the receiver means further comprising second pseudorandom number generating means for generating a second pseudorandom number sequence identical to the first pseudorandom number sequence generated in the transmitter.

17. The encryption system according to claim 16, the receiver means further comprising decoding means for combining the ciphertext with the second pseudorandom number sequence and the random offset of the transmitter means to produce the original plaintext data.

18. A method for encrypting a sequence of plaintext data comprising the steps:
generating a first pseudorandom number sequence;
generating a random offset;
encrypting the plaintext data to produce ciphertext by logically combining the plaintext data with the first pseudorandom number sequence, deferring the starting point of the first pseudorandom number sequence in accordance with the offset; and
exporting the ciphertext in combination with the initialization vector and the offset.

19. The method according to claim 18 further including decrypting of the ciphertext in a receiver, the decrypting comprising the steps:
importing the ciphertext combination;
separating the ciphertext from the initialization vector and the offset in the ciphertext combination;
generating a second pseudorandom number sequence identical to the first pseudorandom number sequence utilizing the imported initialization vector and the secret key; and
decrypting the imported ciphertext by combining the ciphertext with the offset and the second pseudorandom number sequence.

20. The method according to claim 18 wherein the step of generating a first pseudorandom number sequence includes the step of generating the sequence from an initialization vector and a secret key, where the length of the pseudorandom number sequence exceeds the length of the plaintext data sequence.

21. The method according to claim 18, wherein the step of generating a first pseudorandom number sequence further comprises the step of storing the generated first pseudorandom number sequence and its corresponding initialization vector for future use in decrypting.

22. The method according to claim 18 wherein the method of encrypting a sequence of plaintext data further comprises the step of encrypting the offset with the first pseudorandom number sequence.

23. The method according to claim 22 wherein the step of exporting the ciphertext further includes combining the ciphertext with the initialization vector and the encrypted offset.

24. The method according to claim 19 wherein the step of separating the ciphertext further includes separating the ciphertext from the initialization vector and an encrypted offset in the ciphertext combination.

25. The method according to claim 19, wherein the step of generating a second pseudorandom number from the imported initialization vector further comprises the step of storing the generated second pseudorandom number and its corresponding initialization vector for future use in decrypting.

26. The method according to claim 19 wherein the method of decrypting further includes the step of decrypting the offset by combining the offset with the second pseudorandom sequence.

27. The method according to claim 26 wherein the step of decrypting the imported ciphertext further includes the step of combining the ciphertext with a decrypted offset and the second pseudorandom number sequence.

28. The method according to claim 18 wherein the step of generating a first pseudorandom number sequence further includes the step of generating a plurality of non-contiguous pseudorandom number sequence segments.

29. The method according to claim 28 further including the step of forming a multi-dimensional array from the plurality of pseudorandom number sequence segments.

* * * * *